United States Patent [19]

Kröbel

[11] 4,281,915

[45] Aug. 4, 1981

[54] ARRANGEMENT FOR OPENING AND CLOSING A CLOSURE OF AN OPENING IN A FILM CASSETTE

[75] Inventor: Heinz Kröbel, Taufkirchen, Fed. Rep. of Germany

[73] Assignee: Agfa-Gevaert Aktiengesellschaft, Leverkusen, Fed. Rep. of Germany

[21] Appl. No.: 174,026

[22] Filed: Jul. 31, 1980

[30] Foreign Application Priority Data

Aug. 30, 1979 [DE] Fed. Rep. of Germany ....... 2934985

[51] Int. Cl.³ .................... G03B 17/26; G11B 1/00
[52] U.S. Cl. ................................. 354/275; 250/471
[58] Field of Search ............... 354/275, 120, 121, 123, 354/124; 250/468–471

[56] References Cited

U.S. PATENT DOCUMENTS

| | | | |
|---|---|---|---|
| 2,446,200 | 8/1948 | Tait et al. | 354/121 |
| 2,513,740 | 7/1950 | Perlin | 354/121 |
| 3,173,010 | 3/1965 | Barrett et al. | 250/471 |
| 4,135,802 | 1/1979 | Scharre et al. | 354/275 |
| 4,194,822 | 3/1980 | Sethi | 354/121 |

Primary Examiner—Donald A. Griffin
Attorney, Agent, or Firm—Peter K. Kontler

[57] ABSTRACT

An arrangement for opening and closing a closure of an opening in a film cassette includes a rotary member which has a cam surface provided thereon and a connecting link articulated thereto. A cam follower roller is mounted on a mounting plate which is mounted on a support for pivoting about an axis parallel to the direction of displacement of the closure between its open and closed positions, and the connecting link is loosely connected to a carriage which is supported on the mounting plate for displacement along the path of displacement of the closure and carries an entraining member which engages the closure upon pivoting of the mounting plate from its retracted to its extended position toward the respective cassette and entrains the closure of movement with the carriage, during the rotation of the rotary member. The entraining member is mounted on the carriage by means of a lever which cooperates with a micro switch that reverses the rotation of the rotary member when the lever is pivoted as a result of jamming of the closure.

22 Claims, 4 Drawing Figures

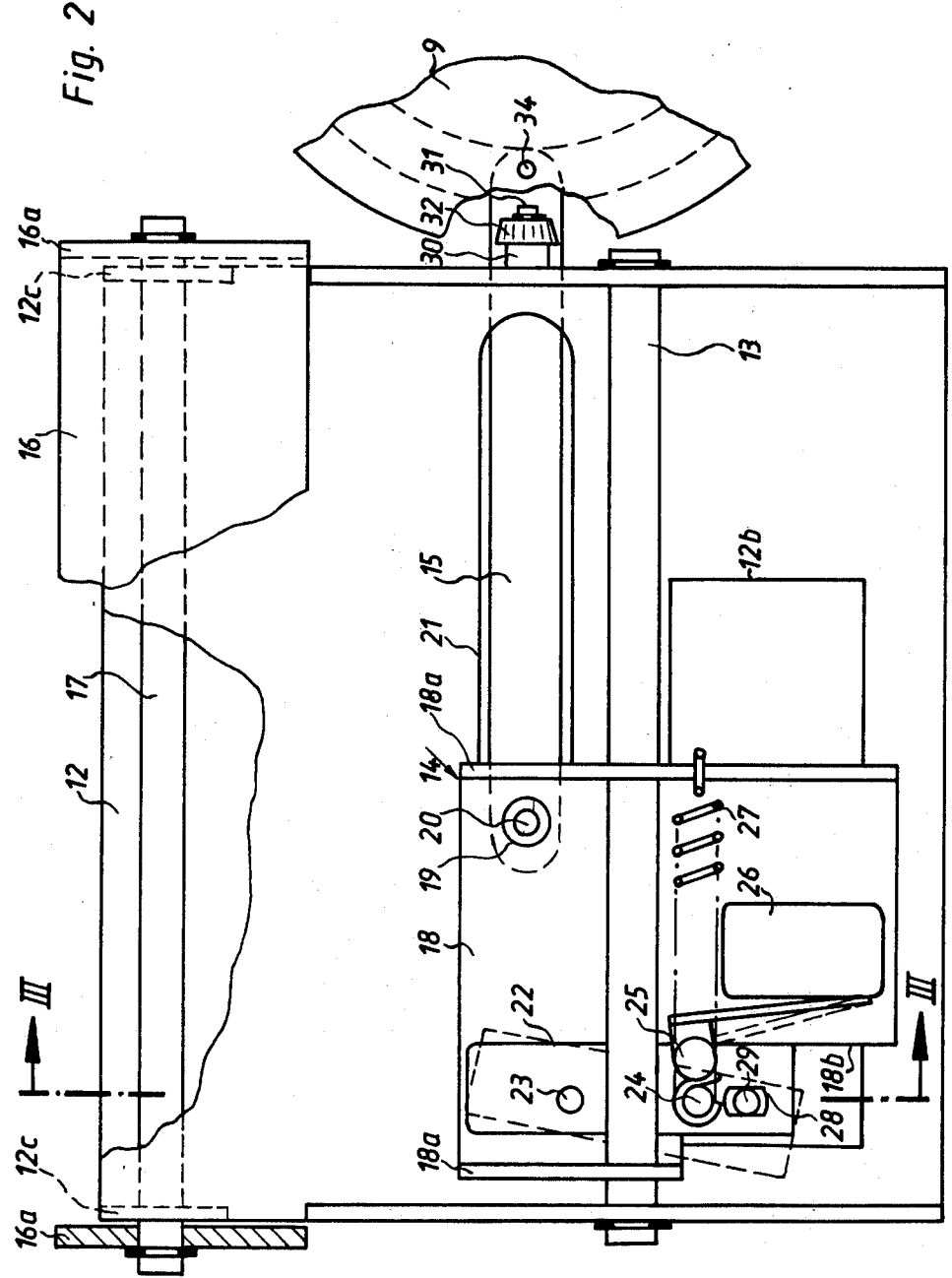

ARRANGEMENT FOR OPENING AND CLOSING A CLOSURE OF AN OPENING IN A FILM CASSETTE

BACKGROUND OF THE INVENTION

The present invention relates to an arrangement for displacing a closure of an opening in a cassette accommodating photosensitive material between closed and opened positions, the arrangement being particularly suited for use in a device for exposing an image, such as an image of a data carrier, onto the photosensitive material through the opening.

Devices of the last-mentioned type are already known and usually they are equipped with a projecting arrangement which projects the image of the data carrier onto the photosensitive material, such as film, accommodated in the cassette, through the opening which is unobstructed by the closure while the projection of the image takes place, with an opening arrangement which is operative for unlatching the closure which, in order to avoid accidental displacement thereof towards its open position during the transportation or the handling of the cassette, is latched in its closed position, and for displacing the closure from its closed position into its open position and then back into its closed position after the image-projecting operation has been concluded, as well as with a control arrangement which controls the performance of the unlatching, opening, projecting and closing operations in the desired sequence. In some of the conventional constructions of the opening arrangement, the latter includes a carriage which carries an entraining member that engages the closure and/or the latching means therefor, the carriage being movable in opposite directions along the path of displacement of the closure relative to the cassette which is properly positioned in the aforementioned device so that the entraining member entrains the closure for joint travel with the same and with the carriage from its closed into its open position and then back to its closed position in which the closure light-tightly obstructs the opening of the cassette.

One opening arrangement of this type has been disclosed in the German published publication DE-AS No. 20 21 494, wherein the entraining member is arranged on a holder which is pivotally mounted on the carriage, the axis of pivoting of the holder relative to the carriage extending normal to the direction of displacement of the carriage. A helical spring applies torque to the holder. In addition thereto, the holder is equipped with a guiding roller which is lifted as it engages the cassette during the initial phase of the displacement of the carriage towards its position corresponding to the open position of the closure until the roller engages the top surface of the cassette, which results in the pivoting of the holder relative to the carriage toward and into the position in which the entraining member engages the closure of the cassette.

Such a construction is relatively complicated and, as a result of that, also prone to malfunction. The radius of pivoting of the entraining member is relatively small, so that it can easily happen that the entraining member will engage the edge of a bore which is provided in the cassette closure for accommodating the entraining member. In addition thereto, the proper functioning of the pivoting mechanism can be assured only when the cassettes have substantially the same thickness or height. In addition thereto, there exists the danger that, when the closure offers substantial resistance to movement, or when the closure becomes stuck or jammed, the entraining member is expelled from the bore in the closure against the action of the spring which biases the same into the bore. If this effect occured during the displacement of the closure towards its closed position, the entraining member would contact and scratch the photosensitive material present in the cassette and the cassette would finally be removed from the device with the closure still in its partially or fully open position. Then, in the event that the photosensitive material has already been previously exposed with an image, such as an x-ray image, the original image-forming operation would have to be repeated, which would, in the example given, expose the patient to additional amounts of radiation. Thus, it may be seen that the conventional construction of the opening arrangement leaves much to be desired.

OBJECTS AND SUMMARY OF THE INVENTION

Accordingly, it is a general object of the present invention to avoid the disadvantages of the prior art.

More particularly, it is an object of the present invention to provide an arrangement for displacing a closure of an opening in a cassette accommodating photosensitive material between its closed and opened positions, which is not possessed of the disadvantages of the conventional arrangements of this type. Still another object of the present invention is to so construct the arrangement of the type here under consideration as to render it possible to achieve a safe and unproblematical displacement of the closure in a simple and inexpensive manner.

It is a further object of the present invention to so design the arrangement as to take into consideration the danger of blocking or discontinuance of displacement of the closure, particularly towards its closed position.

A concomitant object of the present invention is to develop an arrangement of the type here under consideration which is simple in construction, inexpensive to manufacture, easy to use, and reliable nevertheless.

In pursuance of these objects and others which will become apparent hereafter, one feature of the present invention resides in an arrangement for displacing a closure of an opening in a cassette accommodating photosensitive material in a predetermined path between closed and open positions thereof, particularly for use in a device for exposing an image onto the photosensitive materials through the opening, which arrangement, briefly stated, comprises a support; an entraining member; a means for mounting the entraining member for displacement along the predetermined path, including a mounting member (particularly a mounting plate) and a carriage displaceable relative to the latter and carrying the entraining member; means for supporting the mounting member on the support for movement with the carriage and with the entraining member between a retracted and an extended position of the entraining member in which the entraining member respectively is spaced from the path and extends into the path and engages the closure for entraining the same for displacement between the closed and open positions during the displacement of the carriage relative to the mounting member (or plate); means for moving the mounting member (particularly a cam rotatably mounted on the support and having a cam surface, and a cam follower on the mounting member and engaging the cam surface); and means for displacing the carriage (particularly a crank transmission which includes a crank rotatably mounted on the support and a connecting link articulated to the crank and loosely connected to the carriage). Advantageously, the member is mounted on the support for pivoting relative thereto.

When the arrangement is constructed in this manner in accordance with the present invention, it is achieved that the entraining member is lowered into the aforementioned bore of the closure substantially perpendicularly to the plane of the closure. As a result of the tracing of the cam surface which, in accordance with a currently preferred concept of the present invention, is rotated jointly with the crank, there is achieved a simple actuation of the mounting member and, simultaneously, synchronization of the displacement of the carriage with the movement of the entraining member with the carriage and the mounting member on which the latter is mounted, between the retracted and extended positions of the entraining member.

Advantageously, the mounting member is mounted on the support for pivoting about an axis which is parallel to the path of displacement of the carriage relative to the mounting member, and the distance between the entraining member and the pivoting axis is so selected as to substantially correspond to the length of the range of displacement of the carriage. This contributes to the aforementioned substantial perpendicularity of the trajectory of movement of the entraining member to the plane of the closure.

Particularly simple and otherwise advantageous embodiment of the present invention is obtained when the displacing and moving means includes a common rotary member which has an annular portion of a larger diameter which constitutes the cam and has an axial face which constitutes the cam surface, and a second annular portion of a smaller diameter which adjoins the larger-diameter annular portion next to the cam surface and has the connecting link articulated thereto so as to constitute the crank. In this connection, it is particularly advantageous when the cam follower includes a roller rotatably supported on the mounting member and when the roller has a circumferential surface of a conical configuration, in which instance the cam surface is inclined relative to the axis of the rotary member at an angle conforming to that of the roller. It is further advantageous when the cam surface includes a substantially V-shaped recess bounded by two slowly rising cam surface portions. Then, it is further advantageous when the recess and the point of articulation of the connecting link to the smaller-diameter portion of the rotary member is located substantially at the same radial line of the rotary member.

According to a further facet of the present invention, the connecting link is connected to the carriage for limited relative movement. Advantageously, this limited relative movement is achieved when the carriage has an aperture, and the connecting link includes a projection which is freely received in the aperture in all positions of the mounting member.

A further feature of the present invention resides in the manner in which the entraining member is mounted on the carriage. In accordance with a further aspect of the present invention, the entraining member is affixed to a mounting element (such as a lever) supported on the carriage for movement (pivoting) relative thereto in such a trajectory that the entraining member travels substantially along the path of displacement of the carriage relative to the latter when the resistance of the closure to displacement exceeds a predetermined limit. Then, detecting means is provided in accordance with this aspect of the present invention, the detecting means preferably including a switch mounted on the carriage and having an actuating element which extends into the trajectory of a movement of the mounting element (lever) at least when the extent of travel of the mounting element (lever) exceeds a predetermined limit. The mounting element (lever) is preferably urged, especially by a spring, toward an operative position thereof, the biasing means (spring) opposing the travel of the mounting element (lever) out of the operative position with a force which keeps the mounting element (lever) in the operative position unless the resistance of the closure to displacement exceeds the predetermined limit. The switch may be operative for reversing the direction of motion of the crank transmission when the blockage or stoppage of the displacement of the closure takes place as the entraining member entrains the latter for movement toward its open position, so that the closure is returned into its closed position without having ever reached its open position. Then, the switch may also actuate a warning device which indicates that the closure has been returned to its closed position without ever reaching its open position and, consequently, without exposure of the image onto the photosensitive material, so that the operating personnel will become aware of this fact and will be able to take appropriate measures.

The novel features which are considered as characteristic of the invention are set forth in particular in the appended claims. A closure-displacing arrangement for a film-containing cassette, both to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a top plan view of the arrangement depicted in FIG. 1;

DETAILED DESCRIPTION OF THE PREFERRED EMBODIMENT

Figure 1:
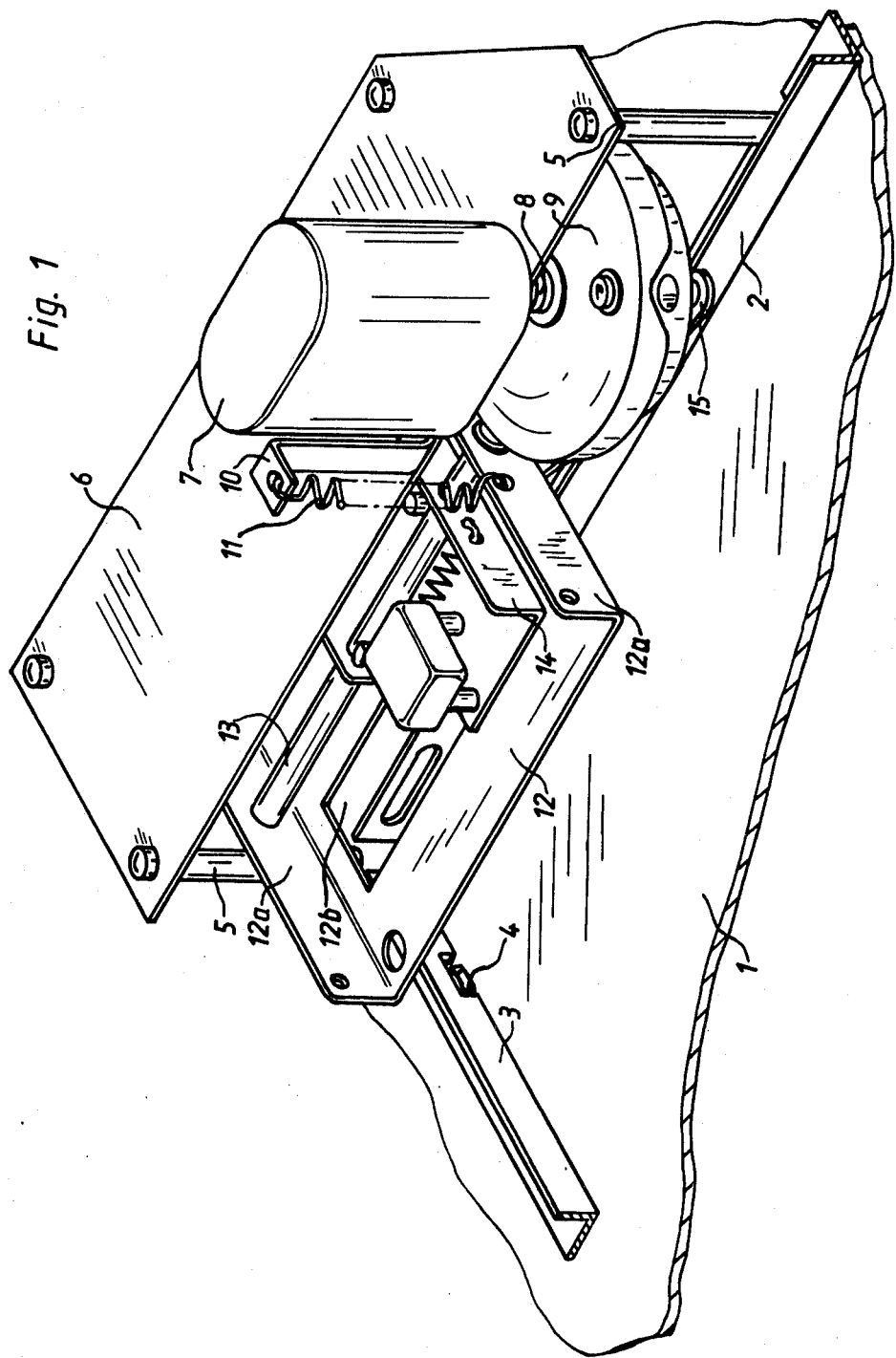
FIG. 1 is a somewhat diagramatic perspective view of an arrangement of the present invention.

Referring now to the drawing in detail, and first to FIG. 1 thereof, it may be seen that the reference numeral 1 has been used to identify a support table of the arrangement of the present invention. A first abutment member 2 and a second abutment member 3 extending at right angles to the first abutment member 2 are provided on the support table 1. A switching element 4 is accommodated in the abutment member 3, this switching element 4 responding to the contact of a film cassette therewith and, hence, with the abutment member 3. In a similar manner, the abutment member 2 may accommodate another switching element of a conventional construction which has been omitted from the drawing and which may extend into a standardized depression in the film cassette so that it will not be actuated when the cassette assumes its desired position. Thus, the combination of these two switching elements serves for detecting the presence and the correct position of a cassette relative to the device in question.

Support elements or pillars 5 are arranged outwardly of the range of movement of the cassette, these pillars 5 carrying a holding plate 6. A motor 7 is mounted on the upper side of the holding plate 6, and a rotary member 9 which is constructed as a crank and cam disc is mounted on a downwardly extending shaft 8 of the motor 7 for joint rotation therewith. Furthermore, a carrier bracket 10 is affixed at the upper side of the holding plate 6, and a tension spring 11 is connected to the carrier bracket 10 at one of its ends, while its other end is connected to a mounting plate 12. The mounting plate 12 is tiltably mounted on the holding plate 6 and underneath the same, in a manner yet to be described in connection with FIGS. 1 and 2. The mounting plate 12 has two lateral portions 12a, and a shaft 13 passes through such lateral portions 12a. A carriage 14 is mounted on the shaft 13 for displacement longitudinally thereof, the carriage 14 carrying an entraining member 37 or an entraining arrangement which is constructed in a manner which will be discussed below. The carriage 14 is connected to a connecting link 15 which, in turn, is articulated to the rotary member 9 as shown, for instance, in FIG. 2 at 34. An opening 12b is provided in the mounting plate 12, and the entraining member 37, which is invisible in FIGS. 1 and 2, extends through this opening 12b into the opening of the properly positioned cassette which is situated underneath the mounting plate 12.

Details of the arrangement which as been just discussed in general terms in connection with FIG. 1 will now be described with reference to FIGS. 2 to 4. As shown in FIG. 2, a U-shaped rail or support 16 is affixed to the lower side of the holding plate 6. The U-shaped rail 16 has two lateral portions 16a which rotatably support a shaft 17. Lateral portions 12c of the mounting plate 12, which are bent opposite to the lateral portions 12a, are rotatably supported on the shaft 17. The mounting plate 12 has a substantially square shape, and the opening 12b is remote from the point of mounting of the plate 12 on the shaft 17. In this manner, there is obtained a relatively huge pivoting radius at the region of the opening 12b, so that the entraining member 37 is moved, during the pivoting of the mounting plate 12, toward the cassette arranged underneath the latter, substantially perpendicularly to the plane of the closure of the cassette.

The carriage 14 also includes a generally U-shaped plate 18 which has lateral portions 18a and a rectangular recess 18b. An aperture 19 is also provided in the plate 18, and a pin-shaped projection 20 extends into the aperture 19 from below, the pin-shaped projection 20 being mounted on that end of the connecting link 15 which is remote from the rotary member 9. Furthermore, the mounting plate 12 is provided with a slot-shaped opening 21 through which the pin-shaped projection 20 of the connecting link 15 extends in the upward direction into the aperture 19 and in which the projection 20 is guided during the displacement of the carriage 14.

A lever 22 is mounted on the carriage 14 for pivoting about an axle 23, and an upwardly extending pin 24 is affixed thereto. The pin 24 cooperates with a roller 25 forming a part of an actuating element of a microswitch 26, in such a manner that the microswitch 27 is depressed or closed in the normal or rest position of the lever 22 shown in full lines in FIG. 2, and open in the displaced or working position of the lever 22 which is illustrated in FIG. 2 in broken lines. The lever 22 is urged towards its rest position by means of a tension spring 27 one end of which is connected to the pin 24 and the other end of which is connected to a lateral part 18a of the carriage plate 18. Additionally, as may best be seen in FIG. 3, a bore 28 is provided in the lever 22, which receives the upper end of a mounting element 29 which mounts the entraining member 27 on the lever 22. The mounting element 29 may be integral with the entraining member 37, or it may be a discrete member which clamps or it otherwise rigidly connected to the entraining member 37 proper.

At the lateral part 12a of the mounting plate 12 which is close to the rotary member 9, there is mounted a roller 30 equipped with a conical cam follower portion 32, for rotation about an axle 31. As may be seen in FIG. 4, the conical portion 32 cooperates with a curve or a cam surface 33 of the rotary member 9. FIG. 4 also shows the bolt 34 or a similar element which passes through the rotary member 9 in parallelism with its axis of rotation and which constitutes the pivoting element about which the connecting link 15 pivots.

Figure 4:
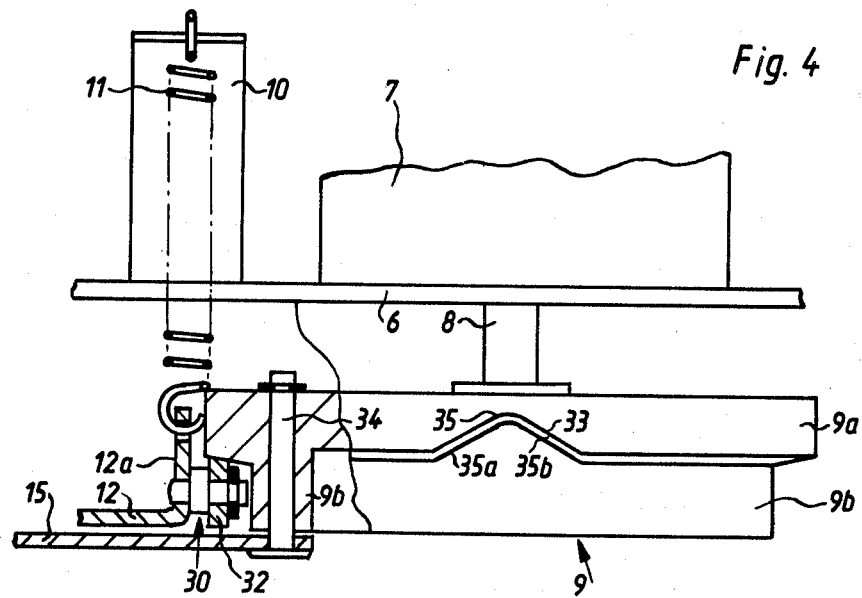
FIG. 4 is partially sectioned side elevational view of a detail of the arrangement of FIG. 1, showing details of construction of a rotary moving and displacing member used in the arrangement of the present invention.

The rotary member 9 is illustrated in FIG. 4 in a partially sectioned view. The rotary member 9 includes a cam portion which is essentially formed by a cylindrical ring 9a having a downwardly facing end face which is so shaped as to constitute the cam surface 33. Herein, the cam surface 33 includes only an essentially V-shaped depression 35 which is defined by slowly ascending or descending inclined surfaces 35a and 35b. The cam surface 33 is provided with a slight inclination in the radial direction in accordance with the shape of the conical portion 32 of the roller 30.

The rotary member 9 further includes a crank portion which is constituted by a cylindrical ring 9b which is located next to the ring 9a and has a smaller diameter than the latter. The bolt 34 which has already been mentioned above passes through this crank part 9a at one location, and one end of the connecting link 15 is connected thereto for pivoting thereabout. In order to facilitate the representation of these features in the drawing, the bolt 34 and the depression 35 of the cam surface 33 are depicted in FIG. 4 as being situated at different locations of the rotary member 9. However, it is to be mentioned in this connection that the deepest point of the depression 35 and the axis of the bolt 34 are in reality situated at the same radial line of the rotary member 9, or at least substantially so. FIG. 3 illustrates a cross section taken on line III—III of FIG. 2 in which further details of the carriage 14 and the components cooperating therewith are shown. It may be seen that the lever 22 has a U-shaped cross section including two arms interconnected by a bight, the lower arm which is identified by the reference numeral 22a being shorter than the upper arm. The upper arm is mounted for angular displacement about the axle 23. A bore is provided in the lower arm 22a, and the mounting element or bolt 29 which carries the entraining member 37 passes through this bore and is guided therein. A compression spring 36 is arranged between the inner surface of the upper arm of the U-shaped lever 22 and a support ring 29a which is supported on the bolt 29 at the vicinity of the inner surface lf the lower arm 22a of the lever 22, the compression spring 36 surrounding the bolt 29 and pressing the same, together with the entraining member 37 which projects downwardly beyond the same, in the downward direction toward the cassette.

The opening 12b in the mounting plate 12 is surrounded by a distancing frame 38 on which there is supported a circumferentially complete strip 39 of foamed rubber or a similar resilient material.

Figure 3:
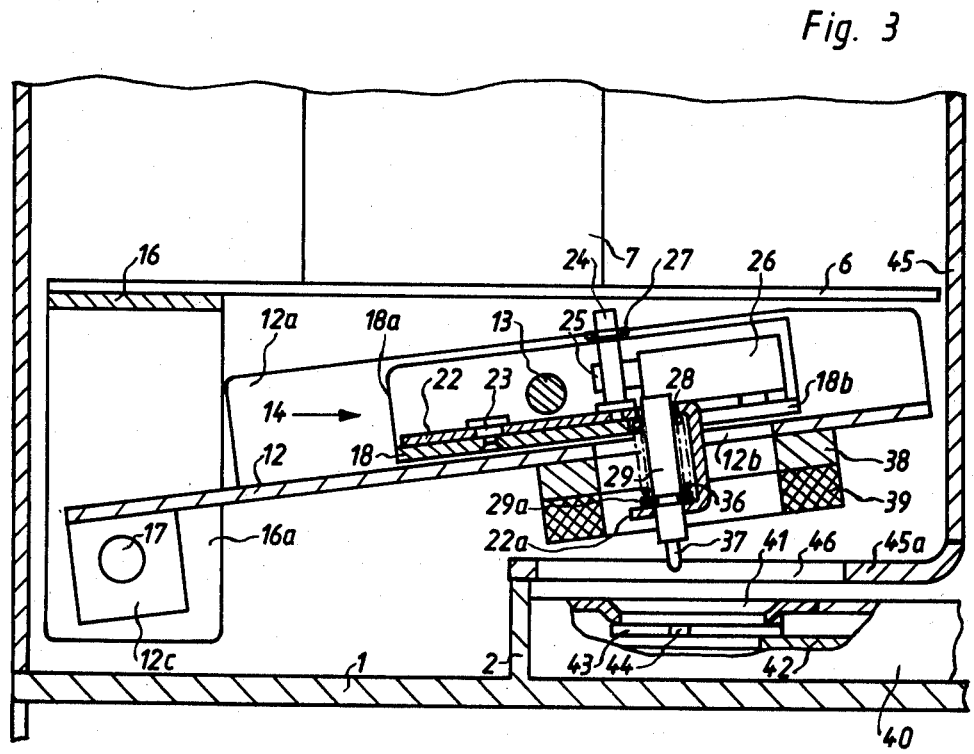
FIG. 3 is a cross-sectional view taken on line III—III of FIG. 2.

FIG. 3 further illustrates only a part of a cassette which is supported on the table 1, the cassette 40 being partially sectioned to show a cassette opening 41, a guiding plate 42, a shiftable or displaceable closure 43 for the opening 41, and a bore 44 provided in the closure 43. The cassette is of a conventional construction, and reference may be had to a commonly owned co-pending application by Bauer et al, Ser. No. 162,523, filed on June 24, 1980, for details of the construction of the cassette which may be handled by the apparatus of the present invention.

A cover plate 45a is mounted on the abutment projections 2 and 3, the plate 45a extending parallel to the base plate or table 1 and having an opening 46 through which the light-sealing strip 39 is guided during the pivoting of the mounting plate 12 until it contacts the upper surface of the cassette 40 to form a light-impermeable barrier around the opening 41. The cover plate 45a merges into a hood 45 which surrounds the arrangement of the present invention and prevents ambient light from reaching the opening 41 of the cassette 40.

Having so described the construction of the arrangement of the present invention based on FIGS. 1 to 4, the operation of this arrangement will now be briefly discussed.

In the rest position of the arrangement, the roller 30 or, more particularly, the conical portion 32 thereof, is situated in the depression 35 of the rotary member of disc 9, so that the mounting plate 12 assumes the position illustrated in FIG. 3. The carriage 14 assumes the position which is illustrated in FIG. 2. As the cassette 40 is introduced into the proper position thereof in which it abuts the abutment projections 2 and 3, the switching elements 4 on the abutment projections 3 and 2 are actuated or not actuated (depending on the construction of the cassette and the type of the switching elements), as a result of which the motor 7 is energized. As a result of this, the rotary member or disk 9 commences its rotation, as a result of which the cam surface 33 pushes the roller 30 in the downward direction, so that the mounting plate 12 is also pivoted about the axis 17 in the same direction. As the mounting plate 12 is lowered, the sealing strip 39 approaches the upper surface of the cassette 40 until it contacts the same and prevents passage of ambient light toward the opening 41 of the cassette 40. Simultaneously therewith, the entraining member 37 penetrates into the bore 44 of the closure 43 where it unlatches, in a conventional manner, the latching mechanism of the closure 37. As the disc 9 continues its rotation, the contecting link 15 is pulled by the same, as a result of which the carriage 14 is displaced in the rightward direction as considered in FIG. 2. The closure 43 is thus entrained by the entraining member 37 for joint displacement with the same and with the carriage 14 on which the entraining member 37 is mounted by means of the bolt 29, the lever 22 and the axle 23, so that the closure 43 moves towards its open position, that is, rightwardly as considered in FIG. 3. When the closure 43 reaches its open position, an image can be projected onto the now accessible region of the film accommodated in the cassette 40, by conventional projecting means which have been ommitted from the drawing in order not to unduly encumber the same. Advantageously, this exposure of the image onto the region of the film which is juxtaposed with the opening 41 takes place at the moment when the connecting link 15 assumes its dead-center position corresponding to the open position of the closure 43. Then, as the rotary disc 9 continues its rotation, the closure 43 is again displaced, this time towards its closed position, inasmuch as the carriage 14 is now displaced by the link 15 in the leftward direction as seen in FIG. 2. When the disc 9 reaches its dead-center position corresponding to the closed position of the closure 43, the depression 35 of the cam surface 33 is aligned with the roller 30 provided with the conical portion 32, so that the mounting plate 12 is lifted by the force of the spring 11, so that the entraining member 37 is retracted from the bore 44 of the closure 43 and the cassette 40 is freed.

In the event that the closure 43 of the cassette 40 offers a substantial amount of resistance to displacement or, should it be impossible, for one reason or another, to fully displace the closure 43 into its open position, the entraining member 37 is arrested at the corresponding position. However, inasmuch as the disc or rotary member 9 continues its rotation at first, also the carriage 14 continues its displacement. As a result of arrest of the entraining member 37 and thus of the bolt 29 carrying the same, and of the further displacement of the carriage 14, the lever 22 is rotated about the axis 23 in the counterclockwise direction against the opposition of the force of the spring 27, until it reaches the broken-line position shown in FIG. 2, as a result of which the arm or actuating element of the switch 26 which is mounted on the carriage 14 assumes its open position. This opening of the switch 24 results in a signal which is transmitted, in a conventional manner, to a control device for the motor 7, which control device causes the reversal of the direction of rotation of the motor 7. This results in a situation where the only partially opened closure 43 is again closed, and the cassette 40 can be removed from the arrangement without having any image projected on the film accommodated therein, but also without the film being damaged by ambient light. In an advantageous manner, the aforementioned switching operation of the switch 26 is used, in a conventional manner, for activating a warning device which indicates to the operating personnel that the exposure of the image or data onto the predetermined region of the film accommodated in the cassette 40 has not taken place and that the closure 43 of this particular cassette 40 is defective.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

I claim:

1. An arrangement for displacing a closure of an opening in a cassette accommodating photosensitive material in a predetermined path between closed and open positions thereof, particularly for use in a device for exposing an image onto the photosensitive material through the opening, comprising a support; an entraining member; means for mounting said entraining member for displacement along said predetermined path, including a mounting member and a carriage displaceable relative to the latter and carrying said entraining member; means for supporting said mounting member on said support for movement with said carriage and with said entraining member between a retracted and an extended position of the entraining member in which the latter respectively is spaced from said path and extends into said path and engages the closure for entraining the same for displacement between the closed and open positions during the displacement of the carriage relative to said mounting member; means for moving said mounting member; and means for displacing said carriage.

2. The arrangement as defined in claim 1, wherein said mounting member has a substantially plate-shaped configuration.

3. The arrangement as defined in claim 1, wherein said supporting means includes means for pivotally mounting said mounting member on said support.

4. The arrangement as defined in claim 3, wherein said path is straight; and wherein said pivotally mounting means mounts said mounting member on said support for pivoting about an axis which is parallel to said path.

5. The arrangement as defined in claim 4, wherein said carriage and said entraining member are so mounted on said mounting member that the distance between said entraining member and said pivoting axis substantially corresponds to the length of the range of displacement of said carriage along said path.

6. The arrangement as defined in claim 1, wherein said displacing means includes a crank transmission connected to said carriage.

7. The arrangement as defined in claim 6, wherein said crank transmission includes a crank rotatably mounted on said support and a connecting link articulated to said crank and connected to said carriage.

8. The arrangement as defined in claim 7, wherein said moving means includes a cam rotatably mounted on said support and having a cam surface, and a cam follower on said mounting member and engaging said cam surface.

9. The arrangement as defined in claim 8, wherein said displacing and moving means includes a common rotary member having a cam portion constituting said cam and a crank portion constituting said crank and having said connecting link articulated thereto.

10. The arrangement as defined in claim 9, wherein said rotary member includes a first annular portion of a larger diameter constituting said cam and having an axial face constituting said cam surface, and a second annular portion of a smaller diameter adjoining said first annular portion and constituting said crank portion.

11. The arrangement as defined in claim 10, wherein said cam follower includes a roller rotatably supported on said mounting member.

12. The arrangement as defined in claim 11, wherein said roller has a circumferential surface of a conical configuration; and wherein said cam surface is inclined relative to the axis of said rotary member.

13. The arrangement as defined in claim 12, wherein the inclination of said cam surface conforms to that of said roller.

14. The arrangement as defined in claim 10, wherein said cam surface includes a substantially V-shaped recess bounded by two slowly rising cam surface portions.

15. The arrangement as defined in claim 14, wherein said recess and the point of articulation of said connecting link to said second portion are located substantially at the same radial line of said rotary member.

16. The arrangement as defined in claim 8, further comprising means for connecting said connecting link to said carriage for limited relative movement.

17. The arrangement as defined in claim 16, wherein said connecting means includes an aperture in said carriage, and a projection on said connecting link which is received in said aperture in all positions of said mounting member.

18. The arrangement as defined in claim 1; and further comprising means for mounting said entraining member on said carriage, including a mounting element supported on said carriage for travel relative thereto in such a trajectory that said entraining member travels substantially along the path of displacement of said carriage relative to the latter when the resistance of the closure of displacement exceeds a predetermined limit; and means for detecting the travel of said mounting element.

19. The arrangement as defined in claim 18, wherein said detecting means includes at least one switch mounted on said carriage and having an actuating element which extends into said trajectory at least when the extend of travel of said mounting element exceeds a predetermined limit.

20. The arrangement as defined in claim 18, wherein said mounting element is a lever mounted on said carriage for pivoting about an axis which is substantially normal to the plane of said path.

21. The arrangement as defined in claim 20, wherein said lever has a substantially U-shaped cross section including two arms and a bight interconnecting said arms, one of said arms being pivotally mounted on said carriage; and wherein said means for mounting said entraining member on said carriage further includes an elongated element guided in said arms and having said entraining member affixed thereto.

22. The arrangement as defined in claim 18; and further comprising means for biasing said mounting element toward an operative position thereof and opposing the travel of said mounting element out of the same with a force which keeps said mounting element in said operative position unless said resistance of said closure exceeds said predetermined limit.

* * * * *